106. COMPOSITIONS,
COATING OR PLASTIC.

95

No. 730,480.

Patented June 9, 1903.

UNITED STATES PATENT OFFICE.

JOHN T. SALTIEL, OF DENVER, COLORADO.

PROCESS OF MAKING ARTIFICIAL STONE, &c.

SPECIFICATION forming part of Letters Patent No. 730,480, dated June 9, 1903.

Application filed November 28, 1902. Serial No. 133,123. (No specimens.)

*To all whom it may concern:*

Be it known that I, JOHN T. SALTIEL, a citizen of the United States, residing at Denver, in the county of Arapahoe and State of Colorado, have invented certain new and useful Improvements in Processes of Making Artificial Stone, &c., of which the following is a specification.

My discovery relates to the manufacture of artificial stone, brick, tile, mortar, or plaster and to the preservation of natural stone; and the invention which constitutes my improvement will be stated in the claims hereto appended.

The object of my invention is the production of a liquid compound which will intimately mix with the dampening-water of the composition and which when molded and exposed to the air for drying or otherwise treated will greatly aid to render the article produced thereby proof against the ravages of heat, water, or weather.

A further object is the preservation of stones which are known to be comparatively easily affected by heat, water, and weather, which object I accomplish by coating or soaking the stone with water in which has been stirred the new liquid compound hereinafter described.

To prepare the liquid compound, take about one-fourth pound of tallow or suet fat and one quart of rain or soft water, boil to a soup, and cool. Next add about three dozen finely-crushed egg-shells to one quart of vinegar, boil together, and cool. Next take four quarts of rain or soft water, heat to lukewarm, and then add, preferably in the following order, one quart of acetic acid, then the fat soup above described, then the egg-shell and vinegar mixture, and then boil the whole and allow it to cool. This liquid compound is kept in sealed vessels until it is stirred in the dampening-water and used.

I have found that a very excellent artificial stone may be made by thoroughly mixing while dry the following ingredients in about the proportions stated, measured by volume, to wit: Granite, from one-inch mesh to a powder, fifteen parts; powdered or fine-crushed glass or glass slag, two parts; sand grit, forty parts; pebbles, thirteen parts; clean hard cinder-clinkers, one to one-fourth inch mesh, eight parts; ochers, seven parts; hydraulic cement, fifteen parts. The whole is now thoroughly dampened and mixed to about the consistency of plastic mortar with water in which has been stirred the new liquid compound above described. Two to five quarts of the liquid compound is sufficient to prepare forty-five gallons of the dampening-water. When prepared as just stated, this composition is ready and suitable to be molded into tile, post, or other desirable shape, or it may be laid as a pavement or wall. It is nearly as strong as granite and stands about the same wear. It is not affected by the weather.

In mixing plasters or clays for brick, tile, and the like the proportions of the compound to the dampening-water is varied; and it will be understood that the proportions of the components and the order in which the steps of the process are carried out may be varied, so long as the effectiveness of the composition is not impaired.

I claim—

1. The process of proofing and strengthening artificial stone, brick, tile and plasters, which consists in dampening the mixed dry ingredients thereof with water in which has been stirred a liquid mixture consisting of warm water, acetic acid, fat soup and egg-shells and vinegar which have been boiled together, substantially in the proportions and manner described.

2. As a step in the art of proofing and strengthening artificial stone, brick, tile and plasters herein described, the process of forming the liquid compound herein described which consists in boiling together warm soft water, acetic acid, fat soup and egg-shells and vinegar, which have been boiled together substantially in the proportions and manner described.

3. The process of forming the artificial-stone-making composition herein described which consists in mixing while dry in or about the proportions stated crushed granite, powdered glass, sand grit, hard cinder-clinkers, pebbles, hydraulic cement, then mixing the same to the consistency of plastic mortar with water, in which has been stirred a liquid mixture consisting of warm soft water, acetic acid, suet or tallow soup and egg-shells and vinegar, substantially as described.

4. As a step in forming the artificial-stone-making composition herein described, the process of forming the liquid mixture which consists in boiling together in warm soft water acetic acid, suet or tallow and water which have been boiled together and cooled, egg-shells and vinegar which have been boiled together and cooled in or about the proportions specified.

In testimony whereof I affix my signature in presence of two witnesses.

JOHN T. SALTIEL.

Witnesses:
WELLS H. MOSES,
A. ROLAND JOHNSON.